H. S. PARMELEE.
Fire-Extinguisher.
No. 6,257. Reissued Jan. 26, 1875.
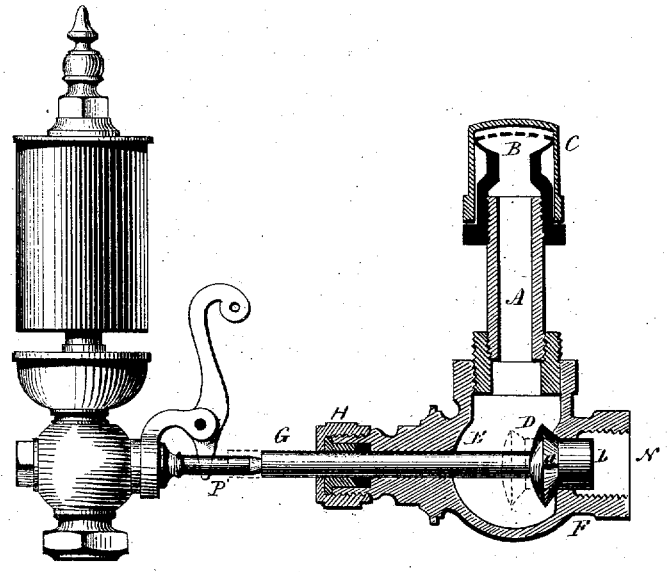
Witnesses.
J. N. Shumway
C. W. Forbes
Henry S. Parmelee
Inventor
By atty.
John E. Earle

UNITED STATES PATENT OFFICE.

HENRY S. PARMELEE, OF NEW HAVEN, CONNECTICUT.

IMPROVEMENT IN FIRE-EXTINGUISHERS.

Specification forming part of Letters Patent No. 156,374, dated October 27, 1874; reissue No. 6,257, dated January 26, 1875; application filed December 31, 1874.

*To all whom it may concern:*

Be it known that I, HENRY S. PARMELEE, of New Haven, in the county of New Haven and State of Connecticut, have invented a new Improvement in Fire-Extinguishers; and I do hereby declare the following, when taken in connection with the accompanying drawings and the letters of reference marked thereon, to be a full, clear, and exact description of the same, and which said drawings constitute part of this specification, and represent a sectional side view.

This invention relates to an improvement in a fire-extinguisher for which Letters Patent were granted to me August 11, 1874, parts of which are applicable to other purposes; and the invention consists, first, in a perforated distributer with a base below its periphery, combined with a hard-metal cap set over and closely fitting the periphery of the said distributer, and extending down to the said base, to which it is secured by a material fusible at a low degree, so that when the cap shall become heated, the said securing material will fuse and free the cap, the close fitting of the cap preventing escape of water from under the cap until after the cap is free, thereby protecting the fusible material from the cooling effects of the water if allowed to escape when but a portion of the material has fused; secondly, in constructing the valve which actuates the alarm so as to extend below the valve-opening, and thereby hold the opening closed until the valve shall have moved its length, whereby an increased movement is given to the valve to act upon the alarm before the full flow of water is attained.

A is the pipe or tube to which the perforated distributer B is attached. Over the distributer the cap C is loosely fitted, and is secured thereon by a metal or material fusible at a low degree—say, 120°—but so as to make a tight joint, and prevent the escape of water, gas, or whatever it may be. In order to prevent the water from flowing freely upon the fusible material, I construct the cap to fit closely the periphery of the distributer; hence, but very little water can reach the joint or fusible material until the cap has passed beyond or entirely from the distributer; therefore, the quantity of water which can reach the fusible material will be so very small as not to materially affect its fusibility. It is desirable, as an additional protection against the cooling influence of the water upon the fusible material, to construct the distributer, as shown, with a neck or recess, *n*, immediately below the distributer and the base. So soon as this cap shall have become heated to the previously-determined degree, the material which secures it in place will fuse, thus freeing the cap from its connection, and the pressure within the pipes will force the cap off the distributer, and thereby allow the water to flow freely through the said distributer. This completes the first part of my invention.

D is the valve, arranged within the chamber E to fit upon the seat F, in substantially the usual manner, with the spindle G running out through the stuffing-box; also, in the usual manner, upon the under side of the valve is a cylindrical protection, L, which nearly fills the opening through the valve-seat. N is the inlet through which the water, or whatever it may be, is to flow to the distributer; and in order to hold the valve at rest upon its seat—that is, to balance the valve—a slight opening, *a*, is made through the valve, which will allow the water to flow through and fill the chamber E on the back side of the valve; hence, so long as the distributer is closed, the valve must also remain closed, but so soon as the cap is thrown off the pressure upon the back of the valve will be removed, and the valve will open to allow the free flow of the water.

To sound the alarm, (here represented as a steam-whistle actuated through the valve-stem P,) a considerable motion of the valve-spindle G is necessary, more than would naturally be given by the opening of the valve. By the addition of the cylinder L of the valve, the passage cannot be fully open until this part L of the valve has passed back or above the seat; hence, there must be given to the valve an additional movement, according to the length of the part L, and this is sufficient to give the required movement for the alarm. This extension or elongation of the valve to a considerable distance below the valve-opening constitutes the chief element of the second part of my invention, and this is applicable to other purposes than for a fire-extinguisher where it is desirable to sound an alarm.

I do not, broadly, claim a cap secured over an outlet, to be destroyed or liberated therefrom by heat, as such, I am aware, is not new; but

Having thus fully described my invention, what I do claim as my invention is—

1. A perforated distributer with a base below its periphery, combined with a hard-metal cap set over and closely fitting the periphery of said distributer, and extending down to the said base, to which it is secured by a low fusible material, substantially as and for the purpose specified.

2. In combination with the distributer B, constructed with the neck *n* and base *b*, the cap C, attached to the said base by a fusible material, substantially as and for the purpose set forth.

3. In combination with an alarm, an elongated valve, L, in connection with said alarm, and extending through the valve-opening, whereby the passage closed by said valve is not opened until the valve shall have been moved its length, and the alarm sounded.

HENRY S. PARMELEE.

Witnesses:

JOHN E. EARLE,
C. V. FORBES.